(12) United States Patent
Takahashi et al.

(10) Patent No.: US 7,579,391 B2
(45) Date of Patent: Aug. 25, 2009

(54) TITANIUM DIOXIDE PIGMENTS, PROCESS FOR THE PRODUCTION THEREOF, AND RESIN COMPOSITIONS CONTAINING THE PIGMENTS

(75) Inventors: Hideo Takahashi, Yokkaichi (JP); Masaki Shimojoh, Yokkaichi (JP); Toshihiko Akamatsu, Yokkaichi (JP); Keisuke Iriyama, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 0 days.

(21) Appl. No.: 11/629,990

(22) PCT Filed: Jun. 23, 2005

(86) PCT No.: PCT/JP2005/011531

§ 371 (c)(1),
(2), (4) Date: Feb. 28, 2007

(87) PCT Pub. No.: WO2006/001330

PCT Pub. Date: Jan. 5, 2006

(65) Prior Publication Data

US 2007/0295244 A1    Dec. 27, 2007

(30) Foreign Application Priority Data

Jun. 24, 2004  (JP) .............................. 2004-186188

(51) Int. Cl.
  C08L 23/06 (2006.01)
  C01G 23/047 (2006.01)
  C08K 9/00 (2006.01)
  C09C 1/36 (2006.01)
  C09C 3/12 (2006.01)

(52) U.S. Cl. .................. 523/216; 106/445; 106/446; 427/219; 427/220; 427/221; 428/404; 428/405; 524/81; 524/186; 524/261; 524/379; 524/497

(58) Field of Classification Search .............. 106/445, 106/446; 427/215, 218, 219, 220, 221; 428/404, 428/405; 524/186, 261, 379, 81, 497; 523/216
See application file for complete search history.

(56) References Cited

U.S. PATENT DOCUMENTS

| | | | | |
|---|---|---|---|---|
| 3,545,994 A | * | 12/1970 | Lott et al. | 106/436 |
| 3,640,744 A | * | 2/1972 | Dietz et al. | 106/438 |
| 3,650,793 A | * | 3/1972 | Goodspeed et al. | 106/438 |
| 3,764,362 A | * | 10/1973 | Hinley et al. | 106/446 |
| 3,804,655 A | * | 4/1974 | Hinley et al. | 106/437 |
| 3,825,438 A | * | 7/1974 | Pritchard et al. | 427/218 |
| 3,859,109 A | * | 1/1975 | Wiseman et al. | 106/438 |
| 3,884,871 A | * | 5/1975 | Herman et al. | 523/202 |
| 3,942,999 A | * | 3/1976 | Hinley et al. | 106/428 |
| 4,447,524 A | * | 5/1984 | Uno et al. | 430/538 |
| 5,075,206 A | * | 12/1991 | Noda et al. | 430/531 |
| 5,173,397 A | * | 12/1992 | Noda et al. | 430/531 |
| 5,562,990 A | * | 10/1996 | Tooley et al. | 428/403 |
| 5,599,529 A | * | 2/1997 | Cowie | 424/59 |
| 5,653,794 A | * | 8/1997 | Weber et al. | 106/442 |
| 5,714,310 A | * | 2/1998 | Noda et al. | 430/531 |
| 5,908,498 A | * | 6/1999 | Kauffman et al. | 106/437 |
| 5,910,213 A | * | 6/1999 | Ashdown et al. | 106/436 |
| 6,517,629 B2 | * | 2/2003 | Kinniard | 106/437 |
| 6,544,328 B2 | * | 4/2003 | Roberts et al. | 106/436 |
| 6,894,089 B2 | * | 5/2005 | Mei et al. | 523/212 |
| 7,138,010 B1 | * | 11/2006 | El-Shoubary et al. | 106/448 |
| 7,264,672 B1 | * | 9/2007 | Trabzuni et al. | 106/443 |
| 2005/0228112 A1 | * | 10/2005 | Takahashi et al. | 524/497 |

FOREIGN PATENT DOCUMENTS

| | | | |
|---|---|---|---|
| JP | 52-35625 A | * | 3/1977 |
| JP | 57-36156 | | 2/1982 |
| JP | 2-242846 | | 9/1990 |
| JP | 3-177459 | | 8/1991 |
| JP | 6-100733 | | 4/1994 |
| JP | 9-003211 | | 1/1997 |
| JP | 10-36656 | | 2/1998 |
| JP | 10-147700 | | 6/1998 |
| JP | 10-324817 | | 12/1998 |
| JP | 2004-83904 A | * | 3/2004 |

* cited by examiner

*Primary Examiner*—Anthony J Green
(74) *Attorney, Agent, or Firm*—Paul E. White; Manelli Denison & Selter PLLC

(57) ABSTRACT

The invention provides titanium dioxide pigments for plastics resin compositions which are excellent in dispersibility, light resistance, and weather resistance and little cause surface imperfection. In particular, the invention provides a titanium dioxide pigment suitable for general-purpose plastics resin compositions which can attain excellent dispersion and lacing resistance even when blended in a high concentration; a titanium dioxide pigment suitable for engineering plastics resin compositions which can attain dispersion properties, silver streaking resistance, inhibition of reduction in molecular weight, and thermal discoloration resistance at high levels; a process for the production of the pigments; and resin compositions containing the pigments. A titanium dioxide pigment for plastics resin compositions, characterized in that each titanium dioxide particle has a dense hydrous silica coat covering its surface and an organic compound coat formed on the silica coat not through an interlayer.

7 Claims, No Drawings

TITANIUM DIOXIDE PIGMENTS, PROCESS FOR THE PRODUCTION THEREOF, AND RESIN COMPOSITIONS CONTAINING THE PIGMENTS

TECHNICAL FIELD

The present invention relates to a titanium dioxide pigment suitable for use in plastics resin compositions, a process for producing the same, and a resin composition containing the same.

BACKGROUND ART

Plastics resins include a wide variety of resins, for example, general-purpose resins such as polyolefin resins, polyvinyl chloride resins, ABS resins, polystyrene resins and methacrylic resins, engineering plastics resins such as polycarbonate resins, polyethylene terephthalate resins and polyamide resins, and the like. They are molded into sheets, films, laminates, cast articles, etc. according to their characteristics and used in various fields. Many of the compositions using these plastics resins are required to have hiding properties, and usually contain titanium dioxide pigments high in refractive index for visible light.

However, the surface of titanium dioxide pigments has a high catalytic activity, and plastics resin compositions containing them are low in light resistance and weather resistance and are apt to show deterioration or discoloration with lapse of time. Furthermore, when titanium dioxide pigments are blended in resin compositions and the compositions are processed at high temperatures, surface imperfections generally called lacing (bubbling) or pinholes sometimes occur, which seriously damage the commercial value of the resin compositions. Such surface imperfections are considered to be caused by water volatilized from titanium dioxide pigments.

Among plastics resins, engineering plastics resins have features of excellent impact resistance, heat resistance, electrical characteristics and transparency and high working accuracy, but many of them are high in melting temperature and must be worked at temperatures higher than the working temperatures for general-purpose resins, sometimes resulting in surface imperfections mentioned above. In the case of engineering plastics resins, the surface imperfections are apt to appear as white streaky patterns on the surface of injection molded articles, which are sometimes called silver streaks. The engineering plastics resins have the further problem that hydrolysis reaction of the resins takes place due to the volatilized water, which causes reduction in molecular weight of the resins to damage the strength. There is another problem that some kinds of resins such as polycarbonate resins are apt to discolor to yellowish color tone at high temperatures.

In order to avoid occurrence of such phenomena, for example, it is known to coat a hydrolyzate of an organic silane compound on the surface of a titanium dioxide pigment used for general-purpose plastics resin compositions, particularly, polyolefin resin compositions (Patent Document 1). According to this technology, the titanium dioxide pigment is made hydrophobic by coating with the hydrolyzate to inhibit adsorption of water, thereby reducing the amount of water volatilized and inhibiting formation of surface imperfections.

Furthermore, as for the titanium dioxide pigment to be blended in polycarbonate resin compositions and polyethylene terephthalate resin compositions, it is known to coat the titanium dioxide pigment with a hydrous oxide such as hydrous silica or hydrous alumina, then with a reactive polysiloxane and furthermore with an organometallic compound such as an organosilicon compound (Patent Document 2).

Patent Document 1: JP-A-10-324817

Patent Document 2: JP-A-9-3211

The technology of Patent Document 1 gives a high effect to inhibit occurrence of surface imperfections, but is insufficient in reducing the catalytic activity of titanium dioxide pigment to improve light resistance and weather resistance.

The titanium dioxide pigment disclosed in Patent Document 2 shows excellent effect to inhibit hydrolysis or to give thermal discoloration resistance of engineering plastics resin composition, but is insufficient in inhibiting formation of silver streaks.

DISCLOSURE OF INVENTION

Problem to be Solved by the Invention

The present invention provides a titanium dioxide pigment for plastics resin compositions which are excellent in dispersibility, light resistance, and weather resistance and in which surface imperfections are hardly formed. In particular, the invention provides a titanium dioxide pigment suitable for general-purpose plastics resin compositions which can attain excellent dispersibility and lacing resistance even when blended in a high concentration, and a titanium dioxide pigment suitable for engineering plastics resin compositions which can attain excellent dispersibility and lacing resistance, inhibition of reduction in molecular weight, and thermal discoloration resistance at high levels, a process for producing the titanium dioxide pigment, and a resin composition containing the pigment.

Means for Solving the Problem

As a result of intensive research conducted by the inventors, it has been found that titanium dioxide particles, the surface of which is coated with only hydrous silica as an inorganic compound in the form of a dense layer and is further coated with an organic compound without providing an interlayer between the hydrous silica coating and the organic compound coating, can give excellent light resistance and weather resistance, and are excellent in dispersibility when blended in a resin composition to provide a plastics resin composition having substantially no surface imperfections. Thus, the present invention has been accomplished.

That is, the present invention relates to a titanium dioxide pigment for plastics resin compositions comprising titanium dioxide particles and a dense hydrous silica coating formed on the surface of the titanium oxide particles and an organic compound coating on the hydrous silica coating without having any interlayers between these coatings.

ADVANTAGES OF THE INVENTION

A composition having substantially no surface imperfections and excellent in dispersibility, light resistance and weather resistance can be obtained by using the titanium dioxide pigment for plastics resin compositions of the present invention.

In particular, even when the titanium dioxide pigment of the present invention is blended in a high concentration, there can be obtained a resin composition having substantially no surface imperfections such as lacing and streaks and having a high strength. Moreover, the titanium dioxide pigment has the effect of causing substantially no thermal discoloration for some kinds of resins such as polycarbonate resins.

BEST MODE FOR CARRYING OUT THE INVENTION

The present invention relates to a titanium dioxide pigment for plastics resin compositions comprising titanium dioxide particles and a dense hydrous silica coating on the surface of the titanium dioxide particles and an organic compound coating on the hydrous silica coating without any interlayers between the hydrous silica coating and the organic compound coating. As mentioned above, titanium dioxide pigment has a high surface catalytic activity, and for improving light resistance and weather resistance of titanium dioxide pigment, it has been known to coat on the surface an inorganic compound, e.g., a hydrous oxide (or a hydrate oxide or a hydroxide) such as silica or alumina or an anhydrous oxide. However, the hydrous oxide liberates crystal water at high temperatures, and it is considered that the liberated crystal water is volatilized to cause formation of surface imperfections. Therefore, the hydrous oxide cannot be coated in a large amount, and both the inhibition of formation of surface imperfections and the improvement of light resistance and weather resistance cannot be simultaneously attained. The titanium dioxide pigment coated with an anhydrous oxide is usually obtained by coating a hydrous oxide, followed by calcining at high temperatures, and hence the particles of the pigment are sintered to result in serious deterioration of dispersibility. It is considered that the dense hydrous silica used in the present invention hardly liberates crystal water although it is a hydrous oxide, and besides is high in effect to lower the catalytic activity of titanium dioxide pigment. On the other hand, a coating of silica tends to lower the affinity for plastics resins regardless of whether the coating is dense, porous, hydrous or anhydrous. Therefore, in the present invention, the affinity is improved by coating an organic compound to impart excellent dispersibility.

In the present invention, it is important to use only dense hydrous silica as the inorganic compound coated on the titanium dioxide particles. When hydrous alumina, hydrous zirconium oxide, hydrous titanium oxide, hydrous tin oxide, or hydrous antimony oxide is coated, or these are coated in combination with the dense hydrous silica, or porous hydrous silica is coated alone in order to impart light resistance and weather resistance, the amount of volatilized water cannot be reduced and the effect of the present invention can hardly be obtained. The coating amount of the dense hydrous silica is preferably in the range of 0.5-6% by weight in terms of $SiO_2$ based on the amount of titanium dioxide particles. If the coating amount of the dense hydrous silica is less than the above range, desired light resistance and weather resistance can hardly be obtained, and when it is blended in polycarbonate resin, discoloration resistance can hardly be obtained. If the coating amount is more than the above range, the content of crystal water is too high, and the amount of volatilized water can hardly be reduced. More preferred range of coating amount is 1-3% by weight.

The organic compounds used in the present invention are preferably polyols, organosilicon compounds, alkanolamines or derivatives thereof, higher fatty acids or metal salts thereof, higher hydrocarbons or derivatives thereof, and the like. More preferred are polyols and/or organosilicon compounds. These may be coated alone or two or more of them may be coated or laminated. The coating amount of the organic compound is preferably in the range of 0.5-5% by weight based on the titanium dioxide particles. If the coating amount is less than the above range, the titanium dioxide pigment cannot be rendered sufficiently hydrophobic, and affinity with resin is inferior. Thus, the desired effects can hardly be obtained. If the coating amount is more than the above range, no further effects can be obtained, and the organic compound is sometimes liberated from the titanium dioxide pigment and bleeds to the surface of the resin composition. More preferred coating amount is in the range of 0.5-4% by weight.

These organic compounds can be optionally selected depending on the kind of the plastics resins used. Particularly, polyols are small in selectivity of the resin, and can be used in a wide range, and they are preferred. Moreover, polyols have also the effect to reduce the adsorption of water to some extent. The most preferred embodiment of using polyol is a titanium dioxide pigment on which the dense hydrous silica is coated in an amount of 1-3% by weight and the polyol is coated in an amount of 0.5-2% by weight. As an indication showing the amount of volatilized water at high temperatures, when it is expressed, for example, by the difference in Karl Fischer's water contents at temperatures of 100° C. and 300° C., it is at most 2500 ppm in this titanium dioxide pigment.

On the other hand, the organosilicon compound can render the titanium dioxide pigment highly hydrophobic and can inhibit adsorption of water to sharply reduce the amount of volatilized water. Thus, it is one of the preferred organic compounds. The most preferred embodiment of using organosilicon compound is a titanium dioxide pigment coated with the dense hydrous silica in an amount of 1-3% by weight and the organosilicon compound in an amount of 0.5-2% by weight. The difference in Karl Fischer's water contents at temperatures of 100° C. and 300° C. is at most 2000 ppm in this embodiment.

The titanium dioxide pigment of the present invention is excellent also in dispersibility. When evaluated by the following dispersibility evaluation method, it has a dispersibility of 40 kg/cm² or less. Particularly, the organosilicon compound has a high effect to improve the dispersibility, and a dispersibility of 30 kg/cm² or less is obtained in the above embodiment where the organosilicon compound is used.

(Dispersibility Evaluation Method)

500 g of a titanium dioxide pigment, 500 g of a refrigerated and ground polyethylene resin (SUMIKASEN L-705 manufactured by Sumitomo Chemical Co., Ltd.) and 20 g of zinc stearate are mixed for 5 minutes by a juice mixer. The resulting mixture is melt extruded over 1 hour using Labo plastmill twin-screw extruder with setting the resin temperature at 280° C. and providing a screen of 1450 mesh on the discharging side. Resin pressures at the time of starting of extrusion and after extrusion for 1 hour are measured, and the difference between the resin pressures is taken as a value of dispersibility.

Examples of the polyols used in the present invention are trimethylolpropane, trimethylolethane, ditrimethylolpropane, trimethylolpropane ethoxylate, pentaerythritol, etc., and trimethylolpropane and trimethylolethane are preferred.

Examples of the organosilicon compound used in the present invention are organosilanes, organopolysiloxanes, organosilazanes, etc.

As the organosilanes, mention may be made of, for example, (a) aminosilanes (such as aminopropyltriethoxysilane, N-β(aminoethyl)γ-aminopropyltriethoxysilane and N-phenyl-γ-aminopropyltrimethoxysilane), (b) epoxysilanes (such as γ-glycidoxypropyltrimethoxysilane and β-(3,4-epoxycyclohexyl)ethyltrimethoxysilane), (c) methacrylsilanes (such as γ-(methacryloyloxypropyl)trimethoxysilane), (d) vinylsilanes (such as vinyltrimethoxysilane and vinyltriethoxysilane), (e) mercaptosilanes (such as 3-mercaptopropyltrimethoxysilane), (f) chloroalkylsilanes (such as 3-chloropropyltriethoxysilane), (g) alkylsilanes (such as n-butyltriethoxysilane, isobutyltrimethoxysilane, hexyltrimethoxysilane, hexyltriethoxysilane, hexylmethyldimethoxysilane, hexylmethyldiethoxysilane, cyclohexylmethyldiethoxysilane, octyltrimethoxysilane, octyltriethoxysilane, and decyltrimethoxysilane), (h) phenylsilanes (such as phenyltriethoxysilane), (i) fluoroalkylsilanes (such as trifluoropropyltrimethoxysilane and tridecafluorooctyltrimethoxysilane), and the like, or hydrolyzates thereof.

As the organopolysiloxanes, mention may be made of, for example, (a) straight type polysiloxanes (such as dimethylpolysiloxane, methyl hydrogen polysiloxane, methylmethoxypolysiloxane and methylphenylpolysiloxane), (b) modified polysiloxanes (such as dimethylpolysiloxanediol, dimethylpolysiloxanedihydrogen, side chain- or both ends-amino modified polysiloxanes, side chain-, both ends- or one end-epoxy modified polysiloxanes, both ends- or one end-methacryl modified polysiloxanes, side chain- or both ends-carboxyl modified polysiloxanes, side chain-, both ends- or one end-carbinol modified polysiloxanes, both ends-phenol modified polysiloxanes, side chain- or both ends-mercapto modified polysiloxanes, both ends- or side chain-polyether modified polysiloxanes, side chain-alkyl modified polysiloxanes, side chain-methylstyryl modified polysiloxanes, side chain-higher carboxylate ester modified polysiloxanes, side chain-fluoroalkyl modified polysiloxanes, side chain-alkyl-carbinol modified polysiloxanes, side chain-amino and both ends-carbinol modified polysiloxanes), and the like, or copolymers thereof.

Furthermore, the organosilazanes include, for example, hexamethylsilazane and hexamethylcyclotrisilazane.

Of the above organosilicon compounds, more preferred are those which have a hydrophobic functional group such as methacryl group ($-OCOC(CH_3)=CH_2$), vinyl group ($-CH=CH_2$), alkyl group ($-R$), aryl group ($-Ph$, $-Ar$, etc.), carboxylate ester group ($-OCOR$), acyl group ($-COR$), polyether group ($-(R^1O)_n(R^2O)mR^3$), or fluorine-containing group ($-(CH_2)nCF_3$, $-(CF_2)_nCF_3$, etc.), and further preferred are organosilanes and organopolysiloxanes having a hydrophobic functional group.

Especially, when the titanium dioxide pigment is blended in general-purpose plastics resins as plastics resins, the organosilicon compound is further preferably an alkylsilane having 4-10 carbon atoms or a hydrolyzate thereof and/or dimethylpolysiloxane. Furthermore, when the titanium dioxide pigment is blended in engineering plastics resins as plastics resins, the organosilicon compound is further preferably at least one compound selected from an alkylsilane having 4-10 carbon atoms, a hydrolyzate thereof, dimethylpolysiloxane, and methyl hydrogen polysiloxane. When an alkylsilane containing an alkyl group having the largest carbon number of 6 (hexyl group) is used, the resulting titanium dioxide pigment is more excellent in dispersibility and heat resistance. The hydrolyzates of organosilanes are those in which the hydrolysable group of the organosilanes is hydrolyzed to become silanole and those in which the silanoles are condensation-polymerized to become a dimer, oligomer or polymer.

When the titanium dioxide pigment of the present invention is blended in particularly polycarbonate resins among engineering plastics resins, it is most preferred to use methyl hydrogen polysiloxane as the organic compound. Polycarbonate resins are one kind of engineering plastics resins, and are known to be apt to discolor at the time of molding at high temperatures, but when methyl hydrogen polysiloxane is used as the organic compound, it gives excellent thermal discoloration resistance to the polycarbonate resins. It is said that the thermal discoloration of polycarbonate resins is caused by oxidation of resins, and furthermore the catalytic activity of the titanium dioxide pigment accelerates the oxidation. It is considered that methyl hydrogen polysiloxane has reducibility and imparts thermal discoloration resistance by synergistic effect with the dense hydrous silica coating.

Examples of other organic compounds usable in the present invention are alkanolamines such as monoethanolamine, monopropanolamine, diethanolamine, dipropanolamine, triethanolamine and tripropanolamine, and derivatives thereof, e.g., organic acid salts such as acetates, oxalates, tartrates, formates and benzoates. The higher fatty acids include stearic acid, lauric acid, oleic acid, etc., metal salts thereof include aluminum salts, zinc salts, magnesium salts, calcium salts, barium salts, etc. The higher hydrocarbons include paraffin wax, polyethylene wax, etc., and derivatives thereof include perfluorinated compounds, etc.

The titanium oxide pigment of the present invention has an average particle diameter (electron photomicrograph method) of preferably 0.1-0.4 μm, more preferably 0.1-0.25 μm. The crystal form may be any of anatase type and rutile type, and may be a mixture of these types. An amorphous titanium dioxide may be partially included as far as attainment of the object is not damaged. The titanium dioxide pigment may be obtained, for example, by so-called sulfate process which comprises hydrolyzing a titanium sulfate solution or so-called chloride process which comprises vapor phase oxidation of halogenated titanium, and the method is not particularly limited.

Next, the present invention relates to a process for producing a titanium dioxide pigment for plastics resin compositions, characterized by forming a dense hydrous silica coating on the surface of titanium dioxide particles, and then further forming an organic compound coating on the surface of the hydrous silica coating.

First, a dense hydrous silica coating is formed on the surface of titanium dioxide particles. Known methods such as disclosed in JP-A-53-33228 can be used for the formation of the coating. The method disclosed in JP-A-53-33228 comprises rapidly adding sodium silicate to a slurry of titanium dioxide particles while keeping the slurry at a temperature in the range of 80-100° C., preferably with adjusting pH of the slurry to a range of 9-10.5, neutralizing the slurry at a pH of 9-10.5, and then keeping the temperature in the range of 80-100° C. for 50-60 minutes. In the present invention, the dense hydrous silica coating can also be obtained by the following method.

(Method for Formation of a Dense Hydrous Silica Coating)

First, titanium dioxide particles are dispersed in water to obtain an aqueous slurry. In this case, wet type mills such as vertical sand mill, horizontal sand mill and ball mill may be used depending on the degree of agglomeration of the titanium dioxide particles. Preferably, pH of the aqueous slurry is adjusted to 9 or higher because the titanium dioxide particles are stably dispersed in water. For the adjustment of pH, there may be used known basic compounds such as hydroxides or carbonates of alkali metals or alkaline earth metals and ammonium compounds, and use of sodium hydroxide is industrially preferred. If necessary, there may be used dispersing agents, for example, phosphoric acid compounds such as sodium hexametaphosphate and sodium pyrophosphate, silicic acid compounds such as sodium silicate and potassium silicate, and the like. The solid matter concentration of titanium dioxide particles in the aqueous slurry is 50-800 g/liter, preferably 100-500 g/liter. If the concentration is higher than 800 g/liter, viscosity of the aqueous slurry becomes too high, and uniform coating of dense silica becomes difficult. If it is lower than 50 g/liter, industrial operability lowers.

In the thus prepared aqueous slurry, the silicate is neutralized with an acidic compound over a period of 30 minutes or more to form a dense hydrous silica coating on the surface of the titanium dioxide particles. More preferably, the neutralization is carried out over 1 hour or more. When the neutralization pH is in the range of 4-7.5 and the temperature of the aqueous slurry during neutralization is at least 80° C., a dense coating is readily formed, and the above conditions are preferred. More preferred range of the neutralization pH is 4.5-7 and range of neutralization temperature is 90° C. or higher. Sodium silicate, potassium silicate or the like can be used as the silicate, and an inorganic acid such as sulfuric acid or hydrochloric acid or an organic acid such as acetic acid or formic acid can be used as the acidic compound.

Whether the hydrous silica coating is dense or not is confirmed by comparing the specific surface area and acid solubility of the hydrous silica coating with those of a porous silica coating coated in the same amount as of the hydrous silica in terms of $SiO_2$. That is, when the silica coating is dense, this coating is smaller in specific surface area and lower in acid solubility than the porous silica coating. The acid solubility in the present invention is measured by the method mentioned below.

(Method for Measurement of Acid Solubility)

0.2 g of a sample is added to 10 ml of 98% sulfuric acid and subjected to ultrasonic dispersion for 1 minute, followed by heating at 180° C. for 1 hour. Successively, the sample is subjected to solid-liquid separation from sulfuric acid by a centrifugal separator, and the amount of titanium oxide (in terms of TiO2) in sulfuric acid is measured by colorimetry. The solubility is calculated from the measurement value by the following formula.

Acid solubility (%)=(amount of titanium oxide (g)/0.2 (g) (amount of charged sample))×100

For coating an organic compound on the titanium dioxide particles coated with the dense hydrous silica, there may be used (1) a method of forming an organic compound coating by solid-liquid separating the titanium dioxide particles from the aqueous slurry and drying the particles, and then contacting them with the organic compound in a gaseous phase to form the organic compound coating, or (2) a method of contacting the titanium dioxide particles with the organic compound in the aqueous slurry. In general, the method (1) is high in yield of the organic compound and the method (2) can perform uniform coating, and hence the method is suitably selected depending on the kind of the organic compound. For example, in the case of the compounds which are not so high in bonding power to titanium dioxide particles or do not bond to the particles, such as polyols, alkanolamines or derivatives thereof, organopolysiloxanes, higher fatty acids or metal salts thereof and higher hydrocarbons, it is preferred to use the method (1). On the other hand, in the case of the compounds which strongly bond to titanium dioxide particles, such as hydrolyzates of organosilanes or alkali metal salts or alkaline earth metal salts such as sodium stearate among higher fatty acid salts which strongly bond to titanium dioxide particles, the method (2) can also be used.

In the method (1), the titanium dioxide particles and the organic compound can be contacted with each other in a gaseous phase by stirring and mixing them using a dry grinder such as a fluid energy grinder or an impact grinder or a high-speed stirrer such as a Henschel mixer or super mixer. Especially, the method of using the dry grinder can perform simultaneously the grinding and the coating of titanium dioxide particles, and thus the method is rational in production step and industrially preferred. The dry grinder is more preferably a fluid energy grinder which is high in grinding efficiency and superior in mixing action, and a pivoted type grinder such as jet mill is further preferred. If necessary, washing may be carried out in the solid-liquid separation.

In the method (2), when dense hydrous silica is coated on the titanium dioxide particles and thereafter consecutively adding the organic compound to the aqueous slurry, followed by stirring and mixing, the steps can be continuously carried out, which is preferred. Even if the organic compound is highly hydrophobic, this method can be easily applied with addition of a compatibilizing agent such as a lower alcohol. In the case of coating a compound having an optimum pH range for bonding to titanium dioxide particles, it is preferred to adjust the pH of the aqueous slurry using an acidic compound or basic compound. For example, in the case of a hydrolyzate of organosilanes, the pH is adjusted to a range of preferably 0.5-6, more preferably 1.5-4. After coating the organic compound, if necessary, washing is carried out, and solid-liquid separation, drying and grinding are carried out.

Furthermore, the present invention relates to a plastics resin composition, characterized by comprising the above titanium dioxide pigment and the plastics resin.

The plastics resins used in the present invention include (I) thermoplastic resins ((1) general-purpose plastics resins (such as (a) polyolefin resins (polyethylene, polypropylene, etc.), (b) polyvinyl chloride resins, (c) ABS resins, (d) polystyrene resins, (e) methacrylic resins, and (f) polyvinylidene chloride resins, (2) engineering plastics resins (such as (a) polycarbonate resins, (b) polyethylene terephthalate resins, (c) polyamide resins, (d) polyacetal resins, (e) modified polyphenylene ethers, and (f) fluororesins), (II) thermosetting resins (such as (a) epoxy resins, (b) phenolic resins, (c) unsaturated polyester resins, (d) polyurethane resins, (e) melamine resins, and (f) silicone resins), and the like, and the plastics resins are not particularly limited. Furthermore, two or more of the resins can also be used in combination for the purpose of improving physical properties such as impact resistance, scratch resistance, chemical resistance and fluidity.

In the present invention, when the resin is a general-purpose plastics resin such as a polyethylene resin, it is preferred to use the above titanium dioxide pigment for general-purpose resins, namely, a titanium dioxide pigment having a coating of at least one organic compound selected from trimethylolpropane, trimethylolethane, alkylsilanes having 4-10 carbon atoms or hydrolyzates thereof, and dimethylpolysiloxane. The general-purpose plastics resin composition of the present invention has substantially no surface imperfections such as lacing and pinholes and has excellent light resistance and weather resistance. Therefore, the resin composition is useful for molded articles such as ordinary utensils, films, mechanical parts, electronic and electric parts, construction parts, and medical instruments. Moreover, the present invention can be applied to not only these molded articles, but also intermediate products such as master batch and color pellets, and it is particularly useful for master batches because surface imperfections hardly occur even when the pigment is used in a high concentration.

In the present invention, when the resin is an engineering plastics resin such as a polycarbonate resin, it is preferred to use the titanium dioxide pigment for engineering plastics, namely, a titanium dioxide pigment having a coating of at least one organic compound selected from trimethylolpropane, trimethylolethane, alkylsilanes having 4-10 carbon atoms or hydrolyzates thereof, dimethylpolysiloxane and methyl hydrogen polysiloxane. The engineering plastics resin composition of the present invention has substantially no failures in working such as silver streaks and is excellent in physical properties such as strength. Furthermore, the resin composition has excellent thermal discoloration resistance as for a polycarbonate resin composition. Therefore, the resin composition is useful for molded articles such as mechanical parts, housings and parts of electronic and electric instruments, medical instruments, optical parts, packing materials, prepaid cards, and automobile parts. Moreover, the present invention can be applied to not only these molded articles, but also intermediate products such as master batch and color pellets, and it is particularly useful for master batches because they are excellent in discoloration resistance and silver streak resistance when the pigment is used in a high concentration.

The blending ratio of the titanium dioxide pigment and the plastics resin is not particularly limited, and the titanium dioxide pigment is blended in an amount of usually 1-80 parts by weight, preferably 1-60 parts by weight for 100 parts by weight of the plastics resin, and in the case of master batch, the pigment is blended in an amount of usually 10-900 parts by weight, more preferably 50-500 parts by weight. Moreover, according to the uses, there may be added various additives such as reinforcing materials, e.g., glass fibers, stabilizers, dispersing agents, lubricants, antioxidants, ultraviolet absorbers and fillers which are known to one skilled in the art.

These resin compositions are obtained by blending the titanium dioxide pigment in molten resin using a kneader. The kneaders may be those generally used, for example, single-screw extruder, twin-screw extruder, intensive mixers such as Banbury mixer, roll machine, etc.

EXAMPLES

The present invention will be explained in more detail in the following examples, which should not be construed as limiting the invention.

1. Examples Relating to Titanium Dioxide Pigments Used for General-Purpose Plastics Resin Compositions:

Example 1

(Formation of Dense Hydrous Silica Coating)

Rutile type titanium dioxide particles of 0.2 μm in average particle diameter were mixed with water, followed by adjusting to a pH of 10 with sodium hydroxide to prepare an aqueous slurry of 300 g/liter in weight of titanium dioxide. Sodium silicate in an amount of 2% by weight as $SiO_2$ based on the weight of titanium dioxide particles was added to the slurry while stirring with keeping at 80° C., and then the slurry was neutralized to a pH of about 5 with sulfuric acid over 1 hour to form a coating of dense hydrous silica.

(Formation of Trimethylolpropane Coating)

The titanium dioxide particle on which a coating of dense hydrous silica was formed were filtered off from the aqueous slurry, washed, and dried at 120° C. for 16 hours, and while grinding by a jet mill, thereto was added 0.5% by weight of trimethylolpropane based on the titanium dioxide particles, followed by mixing to coat the trimethylolpropane, thereby obtaining a titanium dioxide pigment (Sample A) of the present invention.

Example 2

A titanium dioxide pigment (Sample B) of the present invention was obtained in the same manner as in Example 1, except that the coating amount of the dense hydrous silica was 3% by weight.

Example 3

A titanium dioxide pigment (Sample C) of the present invention was obtained in the same manner as in Example 1, except that 0.8% by weight of a hydrolyzate of hexyltriethoxysilane was added in place of trimethylolpropane.

Example 4

A titanium dioxide pigment (Sample D) of the present invention was obtained in the same manner as in Example 1, except that dimethylpolysiloxane was used in place of trimethylolpropane.

Comparative Example 1

A titanium dioxide pigment (Sample E) was obtained in the same manner as in Example 1, except that the dense hydrous silica was not coated.

Comparative Example 2

A titanium dioxide pigment (Sample F) was obtained in the same manner as in Example 1, except that after the dense hydrous silica was coated at the first step in Example 1, successively sodium aluminate in an amount of 2% by weight as $Al_2O_3$ based on the weight of titanium dioxide particles was added to the aqueous slurry while stirring, followed by neutralizing to a pH of 5 with sulfuric acid, thereby to coat hydrous alumina.

Comparative Example 3

A titanium dioxide pigment (Sample G) was obtained in the same manner as in Example 1, except that at the first step of Example 1, the neutralizing time was changed to 10 minutes to form a coating of porous hydrous silica.

Evaluation 1 (Acid Solubility)

Acid solubility of the samples (A, G) obtained in Example 1 and Comparative Example 3 was measured by the method mentioned above. It is considered that the smaller value of the acid solubility shows formation of a denser hydrous silica coating.

Evaluation 2 (Specific Surface Area)

Specific surface area of the samples (A, G) obtained in Example 1 and Comparative Example 3 was measured by BET method using a specific surface area measuring apparatus (FLOWSORB 2300 manufactured by Shimadzu Seisakusho Ltd.). It is considered that the smaller specific surface area shows formation of a denser hydrous silica coating.

The results of the above evaluations are shown in Table 1. It can be seen that the titanium dioxide pigment of the present invention had a dense hydrous silica coated thereon.

TABLE 1

| Example | Sample | Acid solubility (%) | Specific surface area ($m^2/g$) |
|---|---|---|---|
| Example 1 | A | 25 | 10.4 |
| Comparative Example 3 | G | 40 | 13.5 |

Evaluation 3 (Karl Fischer's Water Content)

The samples (A-G) obtained in Examples 1-4 and Comparative Examples 1-3 were left to stand for 24 hours at a constant temperature and humidity of 25° C. and 55% (relative humidity) until reaching equilibrium condition. Then, Karl Fischer's water content in 1 g of the samples was measured at 100° C. and 300° C. using a Karl Fischer's water content measuring apparatus (manufactured by Mitsubishi Chemical Co., Ltd.) and an attached water vaporizing apparatus (manufactured by Mitsubishi Chemical Co., Ltd.), and a difference in water contents at the above temperatures ($\Delta_{300-100}$) was calculated. It is considered that the smaller value of $\Delta_{300-100}$ shows smaller amount of vaporized water at high temperatures.

The results of the above evaporations are shown in Table 2. It can be seen that the titanium dioxide pigments of the present invention were less in amount of vaporized water.

TABLE 2

| Example | Sample | Coating with inorganic compound | Coating with organic compound | Water content (ppm) 100° C. | 300° C. | $\Delta 300-100$ |
|---|---|---|---|---|---|---|
| Example 1 | A | Dense hydrous silica | Trimethylolpropane | 1500 | 3900 | 2400 |
| Example 2 | B | Dense hydrous silica | Trimethylolpropane | 1900 | 4400 | 2500 |
| Example 3 | C | Dense hydrous silica | Hexyltriethoxysilane | 1900 | 3300 | 1400 |
| Example 4 | D | Dense hydrous silica | Dimethylpolysiloxane | 1400 | 2900 | 1500 |
| Comparative Example 1 | E | — | Trimethylolpropane | 1000 | 3200 | 2200 |
| Comparative Example 2 | F | Dense hydrous silica + hydrous alumina | Trimethylolpropane | 5000 | 9500 | 4500 |
| Comparative Example 3 | G | Porous hydrous silica | Trimethylolpropane | 2000 | 6300 | 3700 |

Evaluation 4 (Dispersibility)

Dispersibility of the samples (A-G) obtained in Examples 1-4 and Comparative Examples 1-3 was evaluated by measuring increase of resin pressure in accordance with the above-mentioned method.

Evaluation 5 (Lacing Resistance)

At the time of the above testing of dispersibility, a strand die was fitted at the discharging side of Labo plastmill, and the melt extruded from the strand was visually observed to judge superiority based on the state of bubbling. The criteria of judgment are as follows.

⊚: No bubbling was seen.
○: Bubbling was slightly seen.
Δ: Bubbling was partially seen.
×: Bubbling was seen in the whole melt.

Evaluation 6 (Light Resistance)

Using the samples (A-G) obtained in Examples 1-4 and Comparative Examples 1-3, a mixture having the formulation shown in Tables 3 and 4 were prepared by a V-type blender. The mixture was molten by heating to give a resin temperature of 250° C., and kneaded and extruded using a twin-screw extruder provided with a T-die at the discharging side (PCM-30 manufactured by Ikegai Co., Ltd.), and formed into a sheet of 0.8 mm in thickness by a sheet roll. The resulting sheet was irradiated with black light (wavelength: λ=360 nm) at a irradiation distance of 30 cm for 10 days. Value L, value a and value b of the sheet according to Hunter's color system before and after the irradiation were measured by a color computer (SM-7 manufactured by Suga Tester Co., Ltd.), and ΔE was calculated in accordance with the following formula. The smaller ΔE shows less discoloration and superior light resistance.

$$\Delta E = \{(\Delta L)2 + (\Delta a)2 + (\Delta b)2\}^{1/2}$$

TABLE 3

(Formulation 1)

| | |
|---|---|
| LDPE resin (MIRASON 16: Mitsui Chemicals Inc.) | 500.0 g |
| Titanium dioxide pigment | 25.0 g |
| Fenolic antioxidant (BHT) | 0.5 g |
| Amine lights stabilizer (HALS) (SANOL LS-770: Sankyo Co., Ltd.) | 0.5 g |

TABLE 4

(Formulation 2)

| | |
|---|---|
| HDPE resin (HIZEX 5000S: Mitsui Chemicals Inc.) | 500.0 g |
| Titanium dioxide pigment | 25.0 g |
| Fenolic antioxidant (BHT) | 1.0 g |
| Amine lights stabilizer (HALS) (SANOL LS-770: Sankyo Co., Ltd.) | 0.5 g |

The results of the above evaluations are shown in Table 5. It can be seen that the titanium oxide pigments of the present invention were superior in lacing resistance, dispersibility and light resistance in general-purpose plastics resins.

TABLE 5

| Example | Sample | Coating with inorganic compound | Coating with organic compound | Dispersibility ($\Delta^P$) (kg/cm$^2$) | Lacing resistance | Light resistance ($\Delta^E$) Formulation 1 | Light resistance ($\Delta^E$) Formulation 2 |
|---|---|---|---|---|---|---|---|
| Example 1 | A | Dense hydrous silica | Trimethylolpropane | 30 | ⊚ | 2.3 | 1.0 |
| Example 2 | B | Dense hydrous silica | Trimethylolpropane | 35 | ⊚ | 2.5 | 1.0 |
| Example 3 | C | Dense hydrous silica | Hexyltriethoxysilane | 10 | ⊚ | 1.6 | 1.1 |
| Example 4 | D | Dense hydrous silica | Dimethylpolysiloxane | 20 | ⊚ | 2.1 | 1.3 |
| Comparative Example 1 | E | — | Trimethylolpropane | 80 | ⊚ | 7.8 | 3.8 |
| Comparative Example 2 | F | Dense hydrous silica + hydrous alumina | Trimethylolpropane | 30 | X | 4.1 | 0.9 |
| Comparative Example 3 | G | Porous hydrous silica | Trimethylolpropane | 50 | X | 3.0 | 1.2 |

2. Examples Relating to Titanium Dioxide Pigments Used for Engineering Plastics Resin Compositions:

Examples 5 and 6

Titanium dioxide pigments of the present invention were obtained in the same manner as in Examples 1 and 2, except that methyl hydrogen polysiloxane was used in place of trimethylolpropane in Examples 1 and 2. The resulting pigments are referred to as Samples H and I, respectively.

Comparative Examples 4-6

Titanium dioxide pigments were obtained in the same manner as in Comparative Examples 1-3, except that methyl hydrogen polysiloxane was used in place of trimethylolpropane in Comparative Examples 1-3. The resulting pigments are referred to as Samples J-L, respectively.

Comparative Example 7

(Formation of Porous Hydrous Silica Coating and Hydrous Alumina Coating)
Sodium silicate in an amount of 1% by weight as SiO$_2$ based on the weight of titanium dioxide particles was added to the slurry used in Example 1 while stirring with keeping at 60° C., and then the slurry was neutralized to a pH of about 5 with sulfuric acid over 10 minutes to form a coating of porous hydrous silica. Successively, sodium aluminate in an amount of 0.3% by weight as Al$_2$O$_3$ based on the weight of titanium dioxide particles was added while stirring, followed by neutralizing to a pH of 5 with sulfuric acid to form a coating of hydrous alumina.
(Coating of Hydrolyzate of Hexyltriethoxysilane and Methyl Hydrogen Polysiloxane)
The titanium dioxide particles on which a porous hydrous silica coating and a hydrous alumina coating were formed were filtered off from the aqueous slurry, washed, and dried at 120° C. for 16 hours, and while grinding by a jet mill, methyl hydrogen polysiloxane in an amount of 2% by weight based on the titanium dioxide particles was added into the jet mill, and furthermore a hydrolyzate of hexyltriethoxysilane in an amount of 1% by weight based on the titanium dioxide particles was added to obtain a titanium dioxide pigment (Sample M).

Evaluation 7 (Acid Solubility and Specific Surface Area)

Acid solubility and specific surface area of the samples (H, L) obtained in Example 5 and Comparative Example 6 were measured in the same manner as in the evaluations 1 and 2.

The results of the evaluations are shown in Table 6. It can be seen that dense hydrous silica was coated on the titanium dioxide pigment of the present invention.

TABLE 6

| Example | Sample | Acid solubility (%) | Specific surface area (m$^2$/g) |
|---|---|---|---|
| Example 5 | H | 25 | 11.7 |
| Comparative Example 6 | L | 40 | 15.0 |

Evaluation 8 (Karl Fischer's Water Content)

Karl Fischer's water content of Samples H-M obtained in Examples 5 and 6 and Comparative Examples 4-7 was measured and $\Delta_{300-100}$ was calculated in the same manner as in the evaluation 1.

The results are shown in Table 7. It can be seen that the titanium dioxide pigments of the present invention were less in the amount of volatilized water.

TABLE 7

| Example | Sample | Coating with inorganic compound | Coating with organic compound | Water content (ppm) 100° C. | 300° C. | Δ300-100 |
|---|---|---|---|---|---|---|
| Example 5 | H | Dense hydrous silica | Methyl hydrogen polysiloxane | 1000 | 2600 | 1600 |
| Example 6 | I | Dense hydrous silica | Methyl hydrogen polysiloxane | 1200 | 2900 | 1700 |
| Comparative Example 4 | J | — | Methyl hydrogen polysiloxane | 700 | 2700 | 2000 |
| Comparative Example 5 | K | Dense hydrous silica + hydrous alumina | Methyl hydrogen polysiloxane | 2000 | 6300 | 4300 |
| Comparative Example 6 | L | Porous hydrous silica | Methyl hydrogen polysiloxane | 1800 | 4000 | 2200 |
| Comparative Example 7 | M | Porous hydrous silica + hydrous alumina | Methyl hydrogen polysiloxane + hexyltriethoxysilane | 1100 | 3500 | 2400 |

Evaluation 9 (Silver Streak Resistance and Discoloration Resistance)

120 g of each of Samples H-M obtained in Examples 5 and 6 and Comparative Examples 4-7 and 400 g of a polycarbonate resin (EUPIRON S-2000 manufactured by Mitsubishi Gas Chemical Company, Inc.) were put in a bag made of polyethylene and blended by hand for 5 minutes. The blend was melt extruded at a resin temperature of 300° C. over 7 minutes using a twin-screw extruder provided with a pelletizer on the discharging side (PCM-30 manufactured by Ikegai Co., Ltd.), thereby to prepare pellets. The resulting pellets were molded into a sheet of 1 mm in thickness at a resin temperature of 300° C. using a vertical injection molding machine. The surface of the sheet was visually observed to judge the superiority of silver streak resistance. The criteria of judgment are as follows. Furthermore, value YI (yellow index) of the sheet was measured by a color computer (SM-7 manufactured by Suga Tester Co., Ltd.). The smaller value YI indicates smaller discoloration to yellow and superior discoloration resistance.

⊚: No silver streaks were seen.
○: Silver streaks were slightly seen.
Δ: Silver streaks were partially seen.
×: Silver streaks were seen on the whole sheet.

The above results are shown in Table 8. It can be seen that the titanium dioxide pigments of the present invention were superior in silver streak resistance and discoloration resistance in polycarbonate resins.

TABLE 8

| Example | Sample | Silver streak resistance | Value YI |
|---|---|---|---|
| Example 5 | H | ⊚ | 3.9 |
| Example 6 | I | ⊚ | 3.7 |
| Comparative Example 4 | J | ⊚ | 12.0 |
| Comparative Example 5 | K | X | 3.5 |
| Comparative Example 6 | L | X | 4.0 |
| Comparative Example 7 | M | Δ | 5.5 |

INDUSTRIAL APPLICABILITY

The titanium dioxide pigment for general-purpose plastics resin compositions according to the present invention can be blended in general-purpose plastics resin compositions used for ordinary utensils, films, mechanical parts, electronic and electric parts, construction parts, medical instruments, etc.

The titanium dioxide pigment for engineering plastics resin compositions according to the present invention can be blended in engineering plastics resin compositions used for mechanical parts, housings and parts of electronic and electric instruments, medical instruments, optical parts, packing materials, prepaid cards, automobile parts, etc.

The invention claimed is:

1. A plastic resin composition comprising a titanium dioxide pigment comprising titanium dioxide particles and a dense hydrous silica coating formed on the surface of the titanium dioxide particles and an organic compound coating formed on the dense hydrous silica coating without any interlayers; and
   a LDPE resin.

2. A plastic resin composition according to claim 1, wherein the organic compound is at least one selected from the group consisting of polyols, organosilicon compounds, alkanolamines and derivatives thereof, lauric acid and metal salts thereof, oleic acid and metal salts thereof, paraffin wax and derivatives thereof and polyethylene wax and derivatives thereof.

3. A plastic resin composition according to claim 1, wherein the organic compound is a polyol and/or an organosilicon compound.

4. A plastic resin composition according to claim 1, wherein the organic compound is at least one selected from the group consisting of trimethylolpropane, trimethylolethane, alkylsilanes of 4-10 carbon atoms and hydrolyzates thereof and dimethylpolysiloxane.

5. A plastic resin composition according to claim 1, wherein the coating amount of the dense hydrous silica is in the range of 0.5-6% by weight in terms of $SiO_2$ based on the titanium dioxide particles.

6. A plastic resin composition according to claim 1, wherein the coating amount of the organic compound is in the range of 0.5-5% by weight based on the titanium dioxide particles.

7. A process for producing a plastic resin composition comprising
   forming a dense hydrous silica coating on titanium dioxide particles and thereafter forming an organic compound coating on the surface of the dense hydrous silica coating and obtaining a titanium dioxide pigment, and
   blending the titanium dioxide pigment in a molten LDPE resin.

* * * * *